Dec. 27, 1938.  H. W. DUNBAR ET AL  2,142,020
GRINDING MACHINE
Filed Aug. 13, 1937
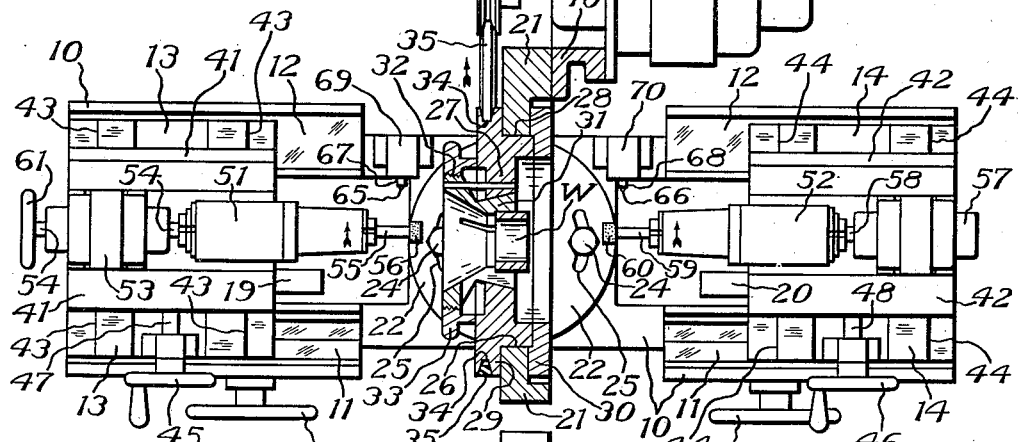
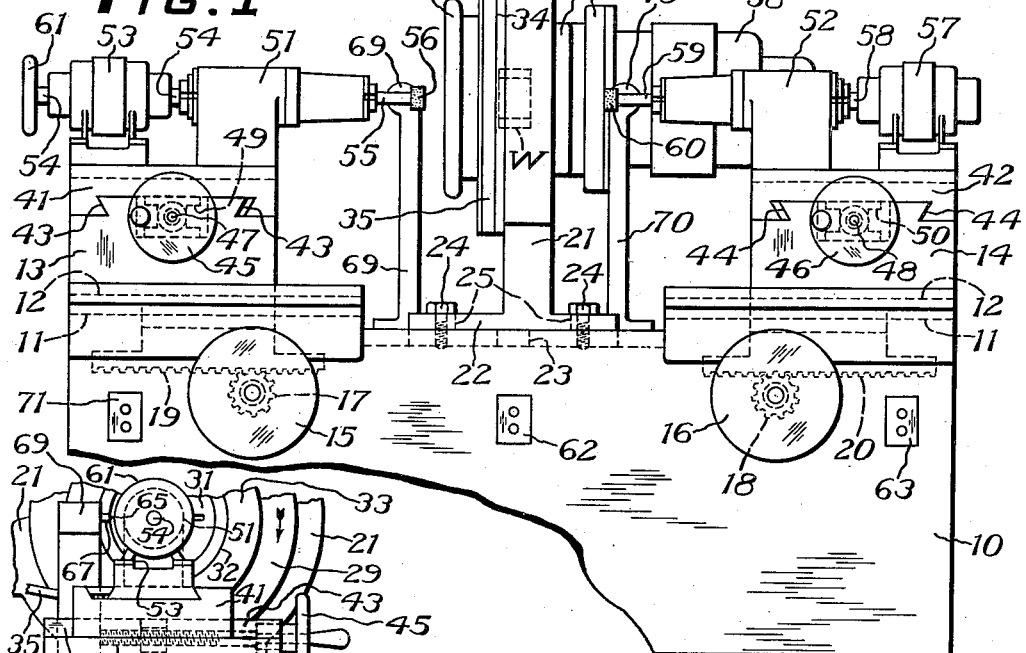
Inventors
HOWARD W. DUNBAR
HERBERT S. INDGE
By George Crompton Jr.
Attorney Patented Dec. 27, 1938

2,142,020

UNITED STATES PATENT OFFICE 2,142,020

GRINDING MACHINE

Howard W. Dunbar, Worcester, and Herbert S. Indge, Westboro, Mass., assignors to Norton Company, Worcester, Mass., a corporation of Massachusetts Application August 13, 1937, Serial No. 158,970

2 Claims. (Cl. 51—3)

The invention relates to grinding machines, and with regard to its more specific features to internal grinding machines.

One object of the invention is to provide a grinding machine capable of producing an extremely fine finish on a work piece. Another object of the invention is to provide an internal grinder of excellent quality. Another object of the invention is to provide a single machine for grinding and polishing the internal surface of a work piece. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawing illustrating one of many possible embodiments of the mechanical features of this invention, Figure 1 is a front elevation of an internal grinder constructed in accordance with the invention, Figure 2 is a view partly in plan and partly in section of the machine, Figure 3 is an end elevation of the machine looking from the left in Figure 1.

Referring first to Figure 1, we provide a base 10. As shown in Figure 3 the base 10 has V ways 11 and flat ways 12 for the support of a table or carriage 13. Referring now to Figures 1 and 2, a second table or carriage 14 is likewise mounted upon the ways 11 and 12 and each carriage may be moved upon the ways at will by means of hand wheels 15 and 16 operating pinion gears 17 and 18 which mesh with racks 19 and 20 attached to the underside of the carriages 13 and 14 respectively.

Between the carriages 13 and 14 we provide an angularly adjustable work head 21 having a circular base plate 22 trunnioned on a trunnion 23 projecting into the base 10. Bolts 24 passing through arcuate slots 25 in the base plate 22 and into the base 10 secure the head 21 in any desired angular position of adjustment.

As shown in Figure 2, the head 21 provides a radial journal surface 26 for a chuck 27 having a central bearing surface 28, an integral flange 29 and a detachable flange 30. An expanding collet 31 has a threaded portion 32 which engages with internal threads in a chuck wheel 33 which may be turned to open and close the collet 31, thus holding and releasing a work piece W. The flange 29 has a V groove 34 for a belt 35 extending from pulley 36 on an armature shaft 37 of a motor 38 that is attached to a bracket 40 extending from the work head 21. Thus the chuck 27 is rotated to rotate the work piece W about its axis for grinding and polishing the internal bore thereof.

Our machine will not only grind the internal bore of a work piece W but will also polish the same to a mirror like surface. Certain machines, especially automobiles, require a so-called running-in period before they may be operated under conditions of high load and speed. It has been found that this is due to the fact that the best grinding operation still leaves grinding lines which may be described as minute ridges and furrows. The polishing operation which removes the ridges or forces them into the furrows gives the work piece such a surface that when it is incorporated in an automobile or other machine, that particular piece does not require a wearing-in period. The present machine will grind and polish the bore of the work piece W during a single chucking thereof. That is to say the work piece W does not have to be removed from the chuck or in any way adjusted therein between the grinding and the polishing operation.

Referring now to Figure 1, mounted upon the table 13 is a cross slide 41. Mounted upon the carriage 14 is a cross slide 42. These slides may be mounted on their respective carriages by means of the usual dove-tailed ways 43 and 44. The cross slides 41 and 42 may be moved and controlled by hand wheels 45 and 46 respectively which turn screw shafts 47 and 48 respectively, which screw shafts engage with nuts 49 and 50 depending from the under side of the slides 41 and 42. Mounted upon the slide 41 is a wheel head 51. Mounted upon the slide 42 is a wheel head 52. A motor 53 has its armature shaft 54 direct coupled to the spindle 55 of an internal grinding wheel 56. Similarly a motor 57 has its armature 58 direct coupled to the spindle 59 of an internal grinding wheel 60. Attached to the left hand end of the armature shaft 54 is a hand wheel 61.

In using the machine the operator first places a work piece W in the expanding collet 31 turning the wheel 33 until the work piece is firmly held. The operator then starts the motor 38 by means of a push button switch 62. The operator then starts the motor 57 by means of a push button switch 63 and taking hold of the hand wheel 16 moves the carriage 14 to carry the wheel 60 into the bore of the work piece W. The operator then turns the cross feed hand wheel 46 to carry the grinding wheel 60 against the bore of the work piece W and proceeds to grind the work piece, traversing the wheel with the hand wheel 16.

When the work piece has been sufficiently ground, the operator withdraws the wheel 60 from the bore thereof and advances the wheel 56 into the work piece by means of the hand wheel 15. He then moves the cross slide 41 to carry the wheel 56 against the work piece W, holding the wheel 61 with one hand. The operator may then slowly traverse the wheel 56 across the face of the work piece by means of the hand wheel 15, at the same time holding the wheel 56 from rotating by means of the hand wheel 61. This produces a lapping or peening operation upon the work piece which smooths and polishes it. When the work piece is thus polished, the operator may withdraw the wheel 56, stop the motor 38, remove the finished work piece W and place an unground work piece in the collet 31, using the hand wheel 33 to open and close the chuck.

For dressing the wheels we provide dressing diamonds 65 and 66 projecting from nibs 67 and 68 attached to brackets 69 and 70 attached to the machine base 10. It is for the purpose of dressing the wheel 56 that the motor 53 is provided, and this motor may be energized for dressing purposes by means of a push button switch 71.

The wheel 56 should preferably be made of abrasive of small grain size bonded with any of the usual bonds, but preferably with a resinous bond, for example shellac or synthetic resins. Rubber may also be effectively used. With a close grained wheel structure and suitable bond the wheel 56 polishes the work piece W when held against rotation and slowly traversed across the face of the bore while the work piece is rotating. The angular velocity of the work piece W is such as is suitable for grinding and of the usual order and so also is the angular velocity of the wheel 60. In the nature of things the operator will not hold the wheel 56 at any exact angular position nor, for two successive operations at the same angular position, and therefore the danger of wearing a flat place on the wheel 56 is avoided. Glazing is also avoided in this manner and the operator will consciously or not slowly index the wheel 56 by imperceptibly turning the hand wheel 61.

It will thus be seen that there has been provided by this invention an apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

We claim:

1. In a grinding machine, a base, a pair of parallel ways mounted on said base, a pair of tables mounted on said ways and spaced apart thereon, an independent traversing mechanism for each of said tables, a work head, a wheel head upon one table with a wheel adapted to grind the work piece, a wheel head on the other table with a wheel adapted to polish the work piece, and manually operable means to hold said latter wheel against rotation during the traversing movement thereof to effect a polishing operation.

2. In an internal grinding machine, means for holding and rotating a work piece providing access to the work piece at either end thereof, a wheel head, a spindle mounted in said wheel head, a grinding wheel on said spindle, means to rotate said spindle, means to adjust said head transversely to effect a relative feeding movement between the wheel and work holder, means to traverse said head longitudinally to produce a relative traversing movement between the wheel and work holder, and means to hold said spindle from rotation whereby to effect a polishing action on the internal bore of a work piece.

HOWARD W. DUNBAR.
HERBERT S. INDGE.